United States Patent
Posin et al.

(10) Patent No.: US 7,407,280 B2
(45) Date of Patent: Aug. 5, 2008

(54) LENS FOR SUNGLASSES, METHOD FOR PRODUCING THE SAME, AND PRODUCTION APPARATUS THEREFOR

(75) Inventors: Thomas Posin, Walnut, CA (US); Ryuji Watanabe, Nyu-gun (JP)

(73) Assignee: Optical Ventures, Inc., West Covina, CA (US)

( * ) Notice: Subject to any disclaimer, the term of this patent is extended or adjusted under 35 U.S.C. 154(b) by 124 days.

(21) Appl. No.: 11/436,998

(22) Filed: May 19, 2006

(65) Prior Publication Data

US 2006/0274259 A1 Dec. 7, 2006

(30) Foreign Application Priority Data

May 27, 2005 (JP) .............................. 2005-154890

(51) Int. Cl.
*G02C 7/10* (2006.01)
*G00C 7/02* (2006.01)
(52) U.S. Cl. ............................ 351/44; 351/49; 351/177
(58) Field of Classification Search .................. 351/41, 351/44, 49, 159, 163, 175–177
See application file for complete search history.

(56) References Cited

U.S. PATENT DOCUMENTS 5,774,201 A * 6/1998 Tackles ....................... 351/159
5,997,139 A 12/1999 Yasuda ....................... 351/49

FOREIGN PATENT DOCUMENTS

JP 3130510 11/2000

\* cited by examiner

*Primary Examiner*—Huy K Mai
(74) *Attorney, Agent, or Firm*—Rabin & Berdo, PC (57) ABSTRACT

A lens for sunglasses is provided which is capable of blocking light incident also from the side, of sufficiently fitting the face of a wearer, and of being attached to any eyeglass frame. The polarizing lens for sunglasses is formed by subjecting a laminated plate having a laterally elongated shape to a bending process and has a curved lens surface which is convex in the front face and concave in the rear face. The curved lens surface is formed into an aspherical curved surface in which the degree of curvature along a lateral axis in the outer side with respect to the center of the lens surface is larger than those along the lateral axis in the inner side and along a vertical axis and continuously varies so as to gradually increase from the center of the lens surface toward the periphery thereof.

5 Claims, 9 Drawing Sheets

LENS FOR SUNGLASSES, METHOD FOR PRODUCING THE SAME, AND PRODUCTION APPARATUS THEREFOR

BACKGROUND OF THE INVENTION

1. Field of the Invention

The present invention relates to a sunglass lens used mainly in sunglasses and goggles, to a method for producing the lens, and to a production apparatus for obtaining the sunglass lens by using the method.

2. Description of the Related Art

Figure 16:
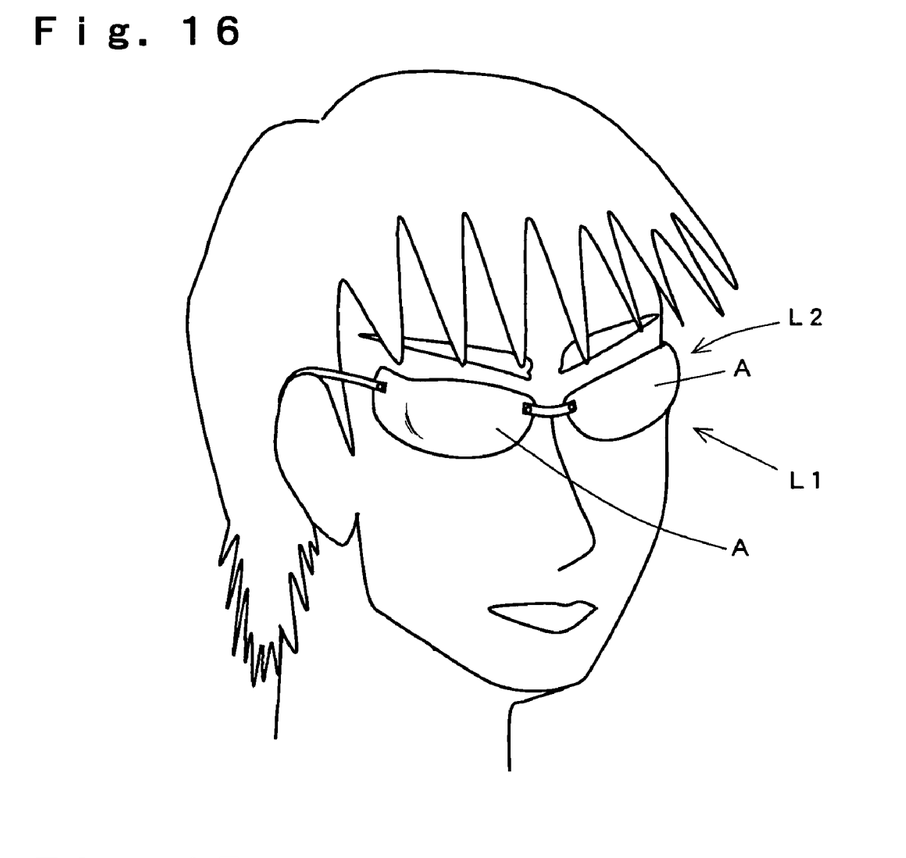
FIG. 16 is a perspective view illustrating the state in which conventional sunglasses are worn.

In recent sunglasses, fashionable appearance is of particular importance. In consideration of this, sunglasses are designed with a narrow width shape as shown in FIG. 16. In such type of sunglasses, in order to provide a function of blocking not only light L1 incident from the front thereof but also light L2 incident from the side thereof, each lens A is largely bent such that the end portion thereof extends to the side of the face of a wearer.

Recently, as a polarizing sunglass lens having a curved shape shown in FIG. 16, a lens has been proposed which has an aspherical lens surface formed by bending a laminated plate produced by laminating a polycarbonate supporting layer to both sides of a thin polarizing layer (see, for example, Publication of Japanese Patent No. 3130510).

This polarizing lens has an aspheric curved lens surface having the degree of curvature of a curved surface along a polarization axis larger than that of a curved surface along the direction orthogonal to the polarization axis and is formed to have, for example, an 8R×5R curved surface. Here, a degree of curvature of "1R" means that the radius of curvature is 523 mm, and the value representing the degree of curvature is inversely proportional to the radius of curvature. Therefore, the larger the radius of curvature becomes, the gentler the curve becomes. On the other hand, the larger the above value becomes, the steeper the curve becomes.

Since this polarizing lens is largely bent along the polarization axis, the lens can block light incident from the side thereof. However, since the lens is bent with a constant radius of curvature, the curved lens surface does not conform to and fit the face of a wearer. Recently, the design of sunglasses is increasingly sophisticated, and there is a demand for sunglasses which fit the face. However, the abovementioned polarizing lens for sunglasses cannot be formed into a shape which adequately fits the face. Thus, the demand cannot be adequately satisfied.

Figure 17:
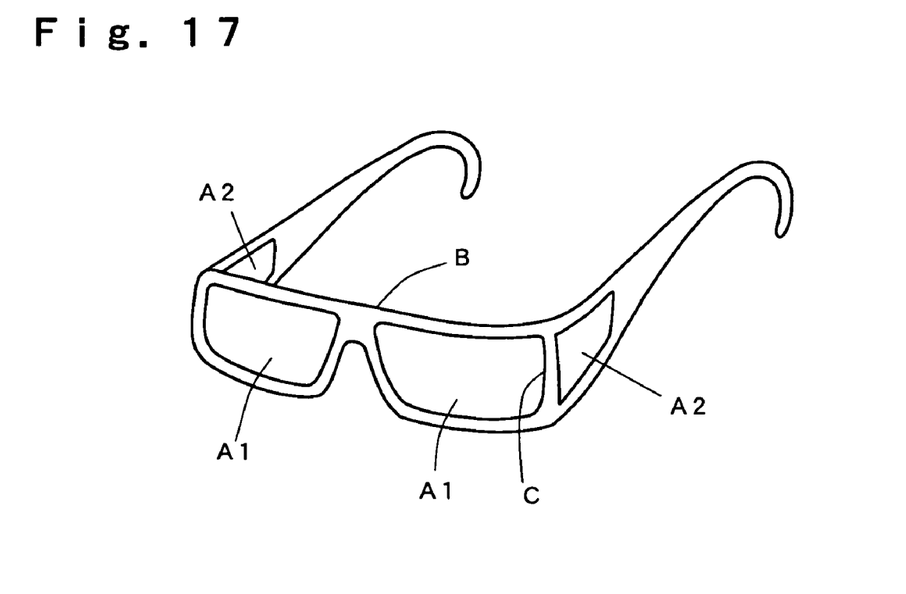
FIG. 17 is a perspective view illustrating conventional sunglasses employing side lenses.

For sunglasses having a frame, even when an eyeglass frame which conforms the face of a wearer is produced, it is difficult to insert a polarizing lens into the eyeglass frame. In order to satisfy the demand, sunglasses have been proposed which have an eyeglass frame B into which front lenses A1 and side lenses A2 are separately inserted as shown in FIG. 17. However, such sunglasses are expensive since the production process is complicated, and a frame C between the front lens A1 and the side lens A2 obstructs the view of a wearer to cause a visibility problem.

SUMMARY OF THE INVENTION

The present invention has been made in view of the above problems. Accordingly, it is an object of the invention to provide a sunglasses lens which is capable of blocking light incident from the side, of fitting the face, and of being attached to any eyeglass frame, a method of producing the sunglass lens, and a production apparatus for obtaining the lens for sunglasses by performing the method.

The sunglasses lens according to the present invention is a sunglass lens which is for a single eye and formed by subjecting a plastic plate to a bending process to thereby form a curved lens surface having a convex front face and a concave rear face. In the sunglass lens, the curved lens surface is formed into an aspherical curved lens surface in which the degree of curvature along a lateral axis in an outer side with respect to the center thereof is larger than that along the lateral axis in an inner side and along a vertical axis and continuously varies so as to gradually increase from the center of the curved lens surface toward a periphery thereof.

Further, the sunglasses lens according to the present invention is a sunglass lens which is for both eyes and formed by subjecting a plastic plate to a bending process to thereby form curved lens surfaces having a convex front face and a concave rear face and arranged on right and left sides of the sunglass lens, respectively. In the sunglass lens, each of the curved lens surfaces is formed into an aspherical curved lens surface in which the degree of curvature along a lateral axis in an outer side with respect to the center of each of the curved lens surfaces is larger than those along the lateral axis in an inner side and along a vertical axis and continuously varies so as to gradually increase from the center of each of the curved lens surfaces toward a periphery thereof.

In the abovementioned sunglass lenses for a single eye and for both eyes, the curved lens surface has a shape in which the degree of curvature along the lateral axis in the outer side with respect to the center is larger than those along the lateral axis in the inner side and along the vertical axis and continuously varies so as to gradually increase from the center toward the periphery. Therefore, curved-shape sunglasses can be obtained which is capable of blocking light incident also from the side and of fitting the face of a wearer. In addition, the sunglass lenses can be attached to a curved-shape eyeglass frame fitting the face of a wearer.

In a preferred embodiment of the present invention, the plastic plate mentioned above is a laminated plate formed of a thin polarizing layer having a polycarbonate supporting layer laminated on each of the sides thereof and is formed into a laterally elongated shape with a polarization axis thereof serving as the lateral axis. Note that the plastic plate is not necessarily limited to such a laminated plate but may be a simple colored plastic plate which does not have a polarization action.

The method for producing a sunglass lens according to the present invention includes: subjecting a plastic plate to a first bending process to form an intermediate product having a curved lens surface with the degrees of curvature along a lateral axis and a vertical axis smaller than those of a final product; and subjecting the intermediate product to a second bending process to produce the final product having the degrees of curvature along the lateral and vertical axes larger than those of the intermediate product and having an aspheric curved lens surface in which the degree of curvature along the lateral axis in an outer side with respect to the center of the curved lens surface is larger than the degrees of curvature along the lateral axis in an inner side and along the vertical axis and continuously varies so as to gradually increase from the center of the curved lens surface toward a periphery thereof.

In the production method of the present invention, the bending process of the plastic plate is performed in stages. That is, the process is divided into the first and second bending processes. Therefore, the plastic plate can be formed into a largely-curved lens surface, and a curved-shape sunglass lens which fits the face of a wearer can be obtained.

The production apparatus for a sunglass lens according to the present invention comprises a molding mechanism for molding the sunglass lens by subjecting a plastic plate to bending processes. The molding mechanism comprises a rough molding device and a finishing molding device. In the rough molding device, an intermediate product is molded by subjecting the plastic plate to a first bending process so that the intermediate product has a curved lens surface with the degrees of curvature along a lateral axis and a vertical axis smaller than those of a final product. In the finishing molding device, the final product is molded by subjecting the intermediate product to a second bending process so that the final product has the degrees of curvature along the lateral and vertical axes larger than those of the intermediate product. Further, the final product has an aspheric curved lens surface in which the degree of curvature along the lateral axis in an outer side with respect to the center of the curved lens surface is larger than the degrees of curvature along the lateral axis in an inner side and along the vertical axis and continuously varies so as to gradually increase from the center of the curved lens surface toward a periphery thereof.

In order to produce a sunglass lens by means of the production apparatus according to the present invention, a laminated plate is pre-heated and is then subjected to the bending processes by means of the molding mechanism. In the molding mechanism, the laminated plate is first subjected to the first bending process by means of the rough molding device to mold the intermediate product having a curved lens surface with the degrees of curvature along the lateral and vertical axes smaller than those of the final product. After the intermediate product is transferred to the finishing molding device, the intermediate product is subjected to the second bending process by means of the finishing molding device to mold the final product. The final product has the degrees of curvature along the lateral and vertical axes larger than those of the intermediate product. Further, the final product has an aspheric curved lens surface in which the degree of curvature along the lateral axis in the outer side with respect to the center of the curved lens surface is larger than those along the lateral axis in the inner side and along the vertical axis and which continuously varies so as to gradually increase from the center of the curved lens surface toward the periphery thereof.

According to the present invention, a sunglass lens which is capable of blocking light incident also from the side and of fitting the face of a wearer can be obtained. Further, the lens can be attached to an eyeglass frame having a curved shape fitting the face.

DETAILED DESCRIPTION OF THE PREFERRED EMBODIMENTS

Figure 1:
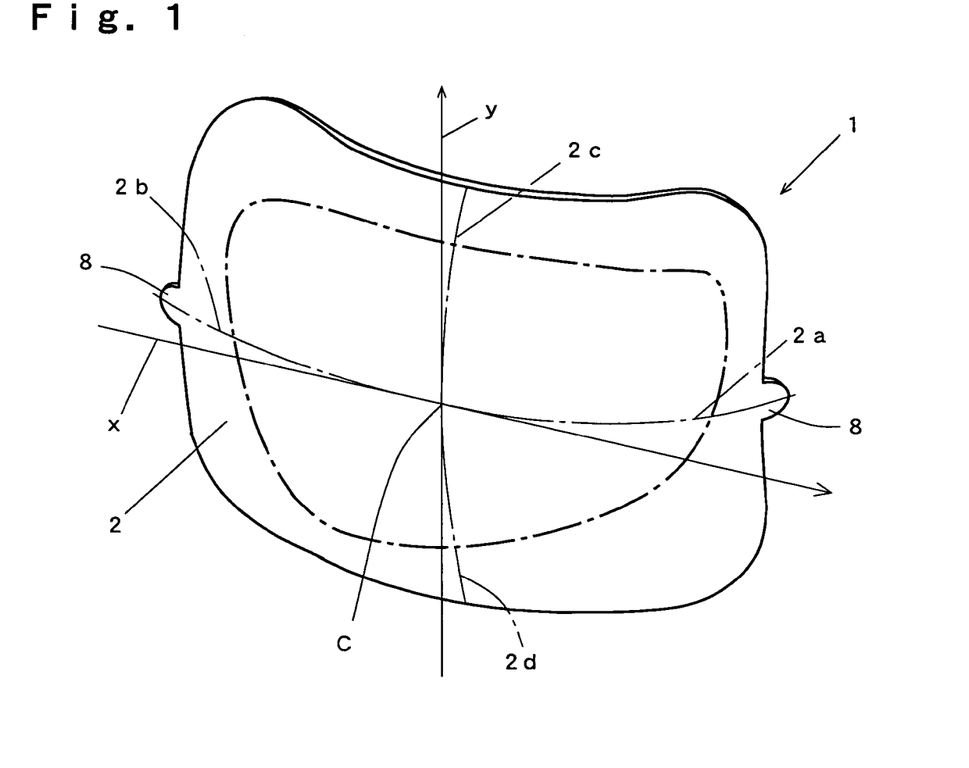
FIG. 1 is a perspective view of a polarizing lens according to an embodiment of the present invention.
Figure 2:
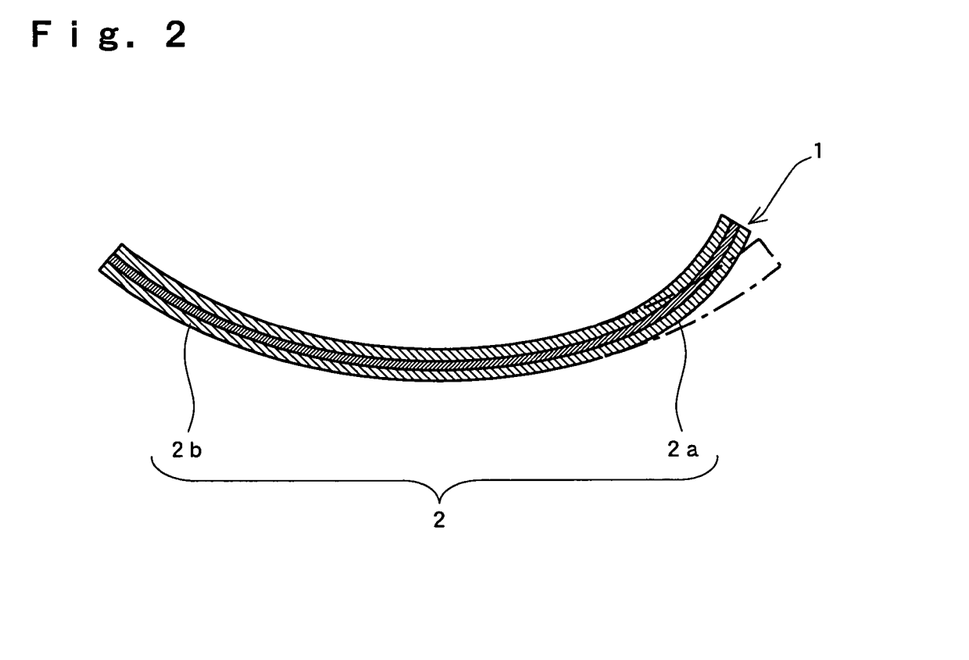
FIG. 2 is a horizontal cross-sectional view of the polarizing lens of the embodiment shown in FIG. 1.
Figure 3:
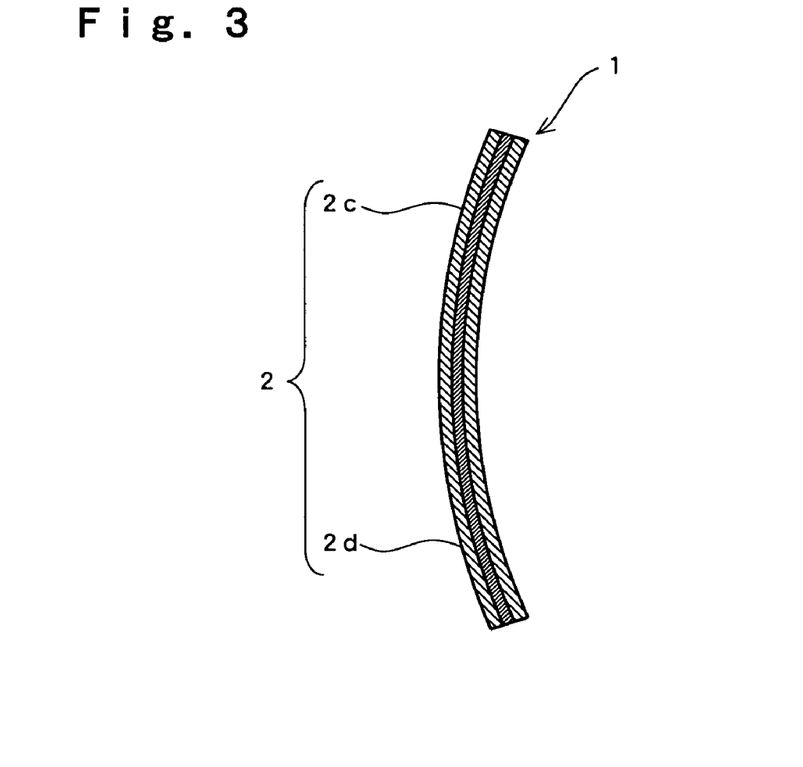
FIG. 3 is a vertical cross-sectional view of the polarizing lens of the embodiment shown in FIG. 1.

FIGS. 1 to 3 illustrate the appearance of a polarizing lens 1 for sunglasses according to one embodiment of the present invention.

The polarizing lens 1 shown in the figures is designed for a single eye and has a curved lens surface 2. The front face of the curved lens surface 2 is convex, and the rear face thereof is concave. The outer shape of this curved lens surface 2 is rectangular and longer in the lateral direction. A lateral axis x is defined as the direction of a polarization axis, and a vertical axis y is defined as the direction orthogonal to the polarization axis. The intersection of the lateral axis x and the vertical axis y shown in the drawings of the present application shall be defined as the center C of the curved lens surface 2. A semicircular tab 8 projects from each edge of the polarizing lens 1 and serves as a mark indicating the direction of the polarization axis.

In FIG. 1, a dashed line shows the shape of a lens when the outer periphery thereof is ground so as to fit an eyeglass frame. The right side edge in the figure corresponds to the temple side of the eyeglass frame, and the left side edge corresponds to the bridge side of the eyeglass frame. Hereinbelow, the outer edge side (the temple side) is referred to as an "outer side," and the inner edge side (the bridge side) is referred to as an "inner side."

The curved lens surface 2 is formed into an aspherical curved lens surface in which the degree of curvature of a curved surface 2a is larger than those of a curved surface 2b, a curved surface 2c, and a curved surface 2d. In addition, in the curved surface 2a, the degree of curvature thereof continuously varies so as to gradually increase from the center C toward the outer periphery. Here, the curved surface 2a lies along the lateral axis x in the outer side with respect to the center C, and the curved surface 2b lies along the lateral axis x in the inner side. Further, the curved surface 2c lies along the vertical axis y in one edge side (the upper edge side in FIG. 1), and the curved surface 2d lies along the vertical axis y in the other edge side (the lower edge side in FIG. 1). In FIG. 2, a dashed line represents the curved surface of a spherical lens.

In the curved lens surface 2 of this embodiment, the degree of curvature of the curved surface 2b along the lateral axis x is coincident with those of the curved surfaces 2c and 2d along the vertical axis. However, the degree of curvature of the curved surface $2a$ along the lateral axis x in the outer side with respect to the center C of the curved lens surface $2$ is larger than that of each of the curved surfaces $2b$, $2c$, and $2d$.

Figure 4:
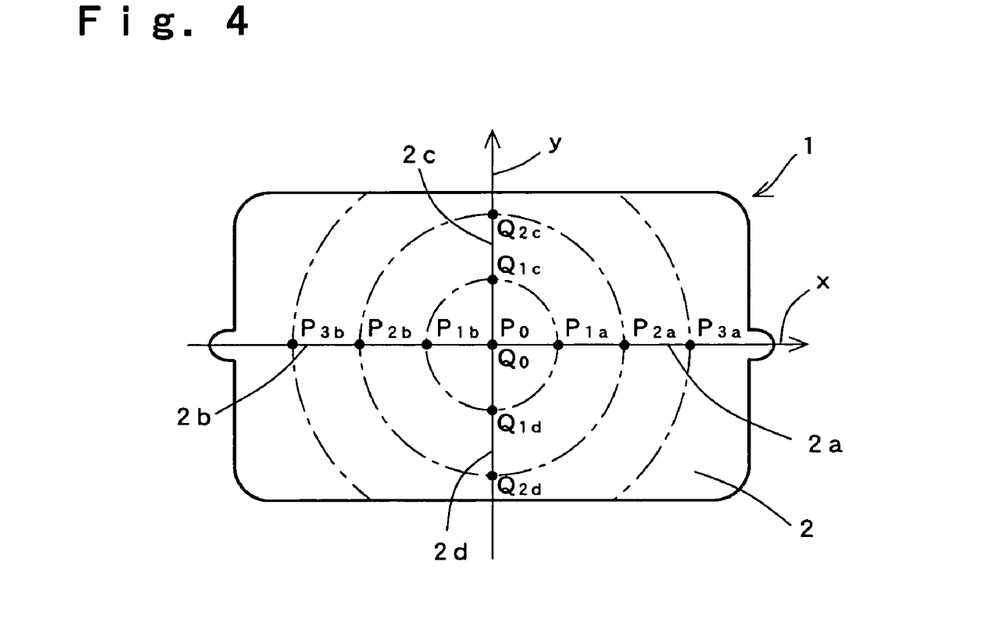
FIG. 4 is a plan view of the polarizing lens of the embodiment shown in FIG. 1 for describing the degree of curvature of the curved lens surface thereof.

FIG. 4 shows a specific example of the degree of curvature of the curved lens surface $2$ of the polarizing lens $1$. Here, concentric circles (shown by dashed lines) are drawn on portions corresponding to the curved lens surface $2$ on the polarizing lens $1$ before bending (a laminated plate to be described later). The intersections of each of the circles with the lateral axis x and vertical axis y are used as representative points on each of the curved surfaces $2a$ to $2d$. The degree of curvature on the curved surface $2b$ along the lateral axis x is set to "8R" at a central point $P_0$ (corresponding to the center C of the curved lens surface $2$) and intersections $P_{1b}$, $P_{2b}$, and $P_{3b}$ on the curved surface $2b$. The degrees of curvature on the curved surface $2a$ along the lateral axis x are set to "9R," "10R," and "11R" at intersections $P_{1a}$, $P_{2a}$, and $P_{3a}$, respectively, on the curved surface $2a$.

Moreover, the degrees of curvature on the curved surfaces $2c$ and $2d$ along the vertical axis y are set to "8R" at a central point $Q_0$ (corresponding to the center C of the curved lens surface $2$), intersections $Q_{1c}$ and $Q_{2c}$ on the curved surface $2c$, and intersections $Q_{1d}$ and $Q_{2d}$ on the curved surface $2d$, respectively.

The value representing the degree of curvature of a curved surface (for example "8R") is inversely proportional to the radius of curvature. Therefore, the larger the value becomes, the steeper the curve of the surface becomes.

In FIG. 4, at all points other than on the lateral axis x and vertical axis y, the value representing the degree of curvature on the curved surface is "8R" in the left half region with respect to the vertical axis y in the figure. And in the right half region, the value continuously varies from the center toward the outer periphery and gradually increases.

FIGS. 5 to 8 show the appearance of a polarizing lens $1$ for sunglasses according to another embodiment of the present invention.

The polarizing lens $1$ shown in the figures is designed for both eyes and has two curved lens surfaces $2R$ and $2L$ on the right and left sides, respectively. The front face of the curved lens surfaces $2R$ and $2L$ is convex, and the rear face thereof is concave. The curved lens surfaces $2R$ and $2L$ are connected with each other, and the entire shape thereof is rectangular and longer in the lateral direction. Lateral axes x1 and x2 are defined as the direction of a polarization axis, and vertical axes y1 and y2 are defined as the direction orthogonal to the polarization axis. The intersection of the lateral axis x1 and the vertical axis y1 shown in the drawings of the present application shall be defined as the center C1 of the right curved lens surface $2R$, and the intersection of the lateral axis x2 and the vertical axis y2 shown in the drawings of the present application shall be defined as the center C2 of the left curved lens surface $2L$. A semicircular tab $8$ projects from each edge of the polarizing lens $1$ and serves as a mark indicating the direction of the polarization axis.

Figure 5:
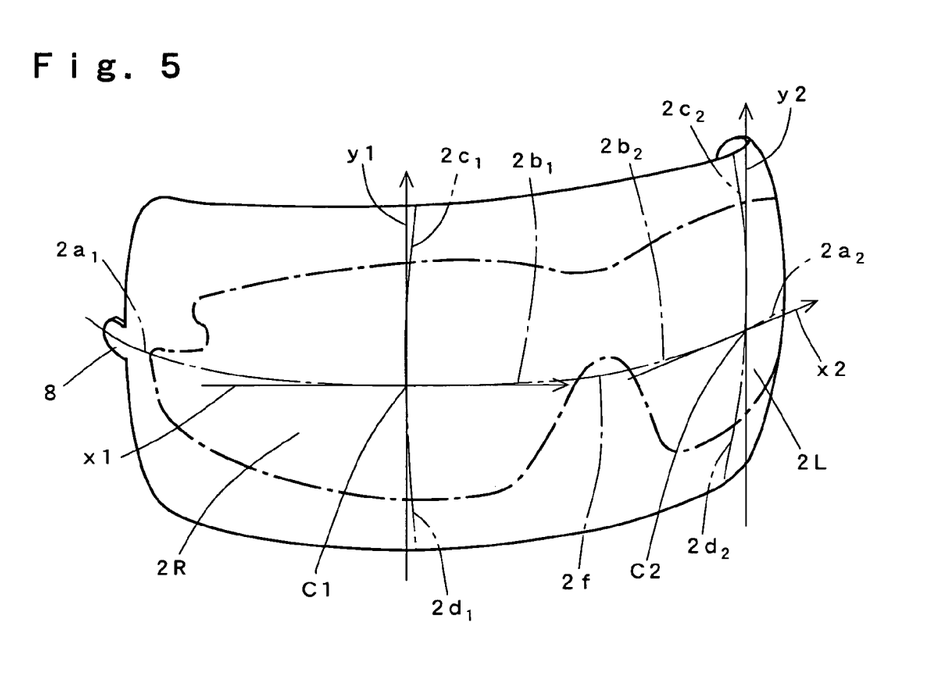
FIG. 5 is a perspective view of a polarizing lens according to another embodiment of the present invention.

In FIG. 5, a dashed line shows the shape of a lens for both eyes when the outer periphery thereof is ground so as to fit an eyeglass frame.

Figure 6:
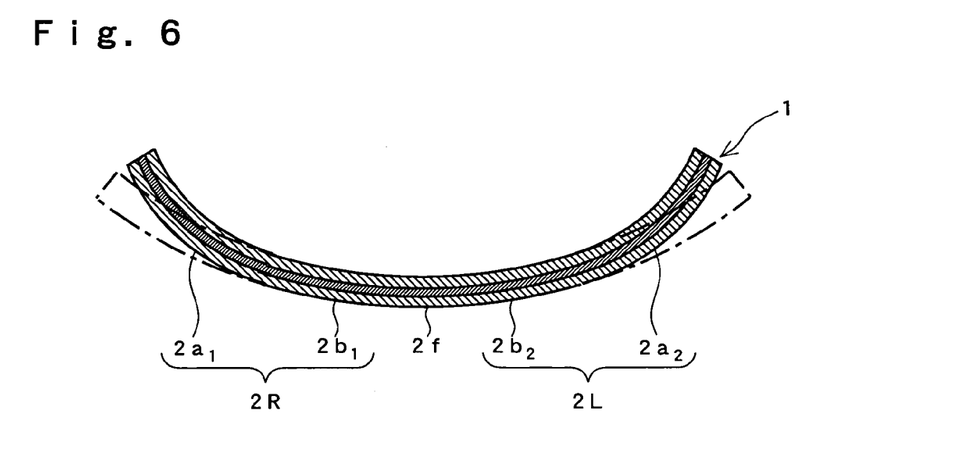
FIG. 6 is a horizontal cross-sectional view of the polarizing lens of the embodiment shown in FIG. 5.
Figure 7:
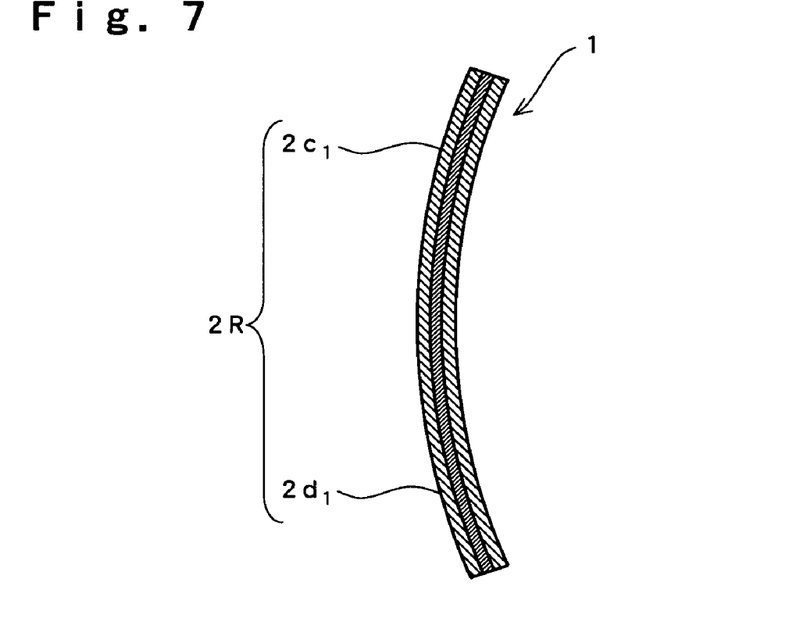
FIG. 7 is a vertical cross-sectional view of the polarizing lens of the embodiment shown in FIG. 5 taken along one curved lens surface.
Figure 8:
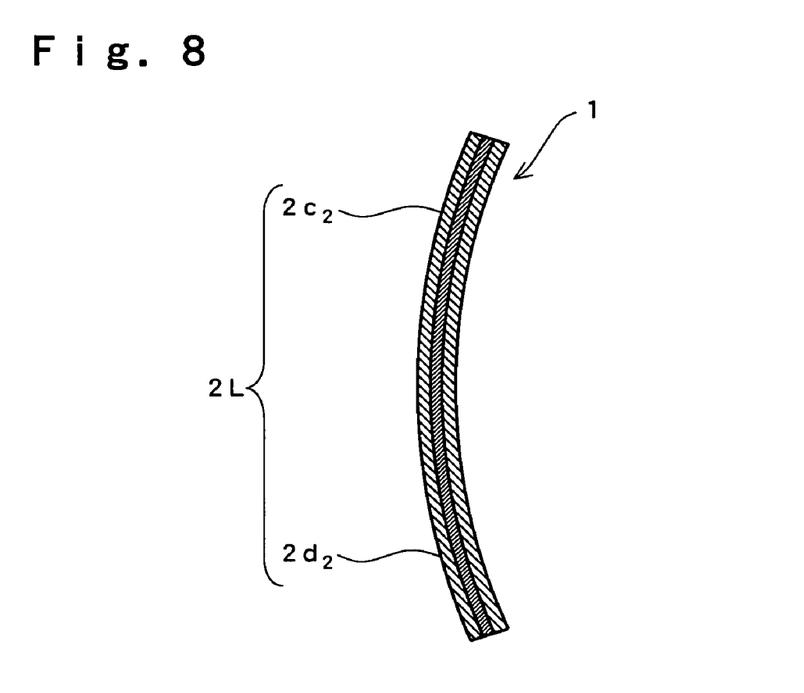
FIG. 8 is a vertical cross-sectional view of the polarizing lens of the embodiment shown in FIG. 5 taken along the other curved lens surface.

Each of the curved lens surfaces $2R$ and $2L$ is formed into an aspherical curved lens surface in which the degree of curvature of each of curved surfaces $2a_1$ and $2a_2$ is larger than those of the corresponding curved surfaces $2b_1$ and $2b_2$, curved surface $2c_1$ and $2c_2$, and curved surface $2d_1$ and $2d_2$. In addition, in each of the curved surfaces $2a_1$ and $2a_2$, the degree of curvature thereof continuously varies so as to gradually increase from each of the centers C1 and C2 toward the outer periphery. Here, the curved surfaces $2a_1$ and $2a_2$ lie along the lateral axes x1 and x2, respectively, in the outer side with respect to the centers C1 and C2, respectively, and the curved surfaces $2b_1$ and $2b_2$ lie along the lateral axes x1 and x2, respectively, in the inner side. Further, the curved surfaces $2c_1$ and $2c_2$ lie along the vertical axes y1 and y2, respectively, in one edge side (the upper edge side in FIG. 5), and the curved surfaces $2d_1$ and $2d_2$ lie along the vertical axes y1 and y2, respectively, in the other edge side (the lower edge side in FIG. 5). The degrees of curvature of the curved surfaces $2b_1$ and $2b_2$ are larger than those of a curved surface $2f$ corresponding to a portion at which the curved lens surfaces $2R$ and $2L$ are connected, the curved surfaces $2c_1$ and $2d_1$ along the vertical axis y1, and the curved surfaces $2c_2$ and $2d_2$ along vertical axis y2. In FIG. 6, a dashed line represents the curved surface of a spherical lens.

Figure 9:
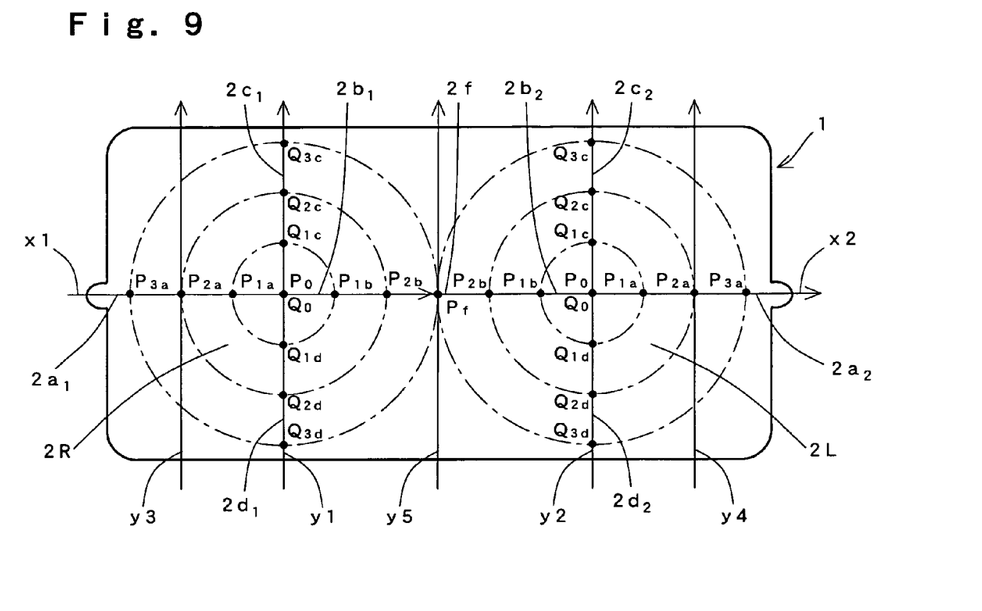
FIG. 9 is a plan view of the polarizing lens of the embodiment shown in FIG. 5 for describing the degree of curvature of the curved lens surface thereof.

FIG. 9 shows a specific example of the degree of curvature of the curved lens surfaces $2R$ and $2L$ of the polarizing lens $1$. Here, concentric circles (shown by dashed lines) are drawn on portions corresponding to the curved lens surfaces $2R$ and $2L$ on the polarizing lens $1$ before bending (a laminated plate to be described later). The intersections of each of the circles with the lateral axes x1 and x2 and vertical axes y1 and y2 are used as representative points on each of the curved surfaces $2a_1$ to $2d_1$ and $2a_2$ to $2d_2$. The degrees of curvature on the curved surfaces $2b_1$ along the lateral axis x1 and $2b_2$ along the lateral axis x2 are set to "6R" at central points $P_0$ (corresponding to the centers C1 and C2 of the curved lens surfaces $2R$ and $2L$, respectively) and intersections $P_{1b}$ on the curved surfaces $2b_1$ and $2b_2$ as well as "5R" at intersections $P2b$. The degrees of curvature on the curved surfaces $2a_1$ along the lateral axis x1 and $2a_2$ along the lateral axis x2 are set to "7R," "8R," and "9R" at intersections $P_{1a}$, $P_{2a}$, and $P_{3a}$, respectively, on the respective curved surfaces $2a_1$ and $2a_2$. Further, the degree of curvature is set to "4R" on the curved surface $2f$ corresponding to a portion at which the curved lens surfaces $2R$ and $2L$ are connected.

Moreover, the degrees of curvature on the curved surfaces $2c_1$ and $2d_1$ along the vertical axis y1 and $2c_2$ and $2d_2$ along the vertical axis y2 are set to "3R" at central points $Q_0$ (corresponding to the centers C1 and C2 of the curved lens surfaces $2R$ and $2L$, respectively), intersections $Q_{1c}$ and $Q_{2c}$ on the curved surfaces $2c_1$ and $2c_2$, and intersections $Q_{1d}$ and $Q_{2d}$ on the curved surfaces $2d_1$ and $2d_2$, respectively.

In FIG. 9, at points other than on the lateral axes x1 and x2 and vertical axes y1 and y2, the degree of curvature is set to an appropriate value. For example, the degrees of curvature on curved surfaces along vertical axes y3 and y4 passing through respective intersections $P_{2a}$ are set to "4R," and the degree of curvature on a curved surface along a vertical axis y5 orthogonal to the curved surface $2f$ is set to "2R."

Figure 10:
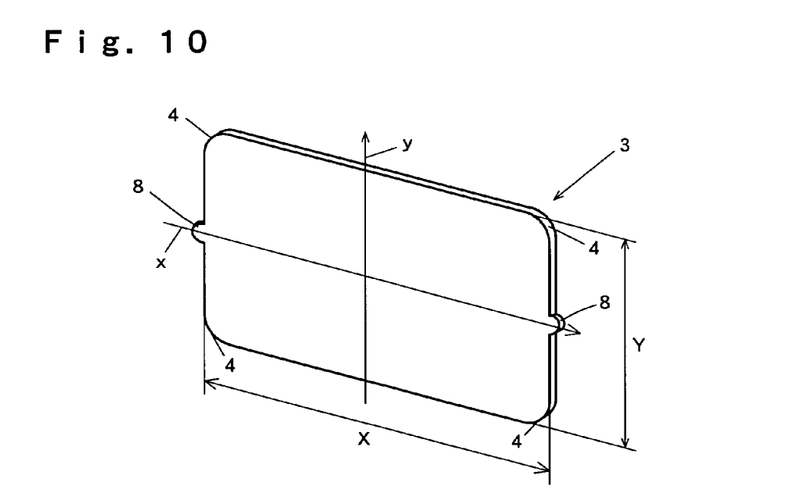
FIG. 10 is a perspective view of a laminated plate.

The abovementioned polarizing lens $1$ shown in FIG. 1 is formed by bending a laterally-elongated laminated plate $3$ longer in the polarization axis (the lateral axis x) direction shown in FIG. 10. The laminated plate $3$ of this embodiment has a lateral length X in the polarization axis direction of 82 mm and a vertical length Y in the direction orthogonal to the polarization axis (the direction of the vertical axis y) of 50 mm. The laminated plate $3$ is formed into a laterally-elongated shape having arc-shaped portions $4$ in the four corners thereof by subjecting a plate-like material of a laminated plate having vertical-lateral dimensions of 270 mm×361 mm to press working by use of a trimming die. Here, the laminated plate $3$ is not necessarily a rectangular shape and may be, for example, a circular shape or an ellipsoidal shape.

Figure 11:
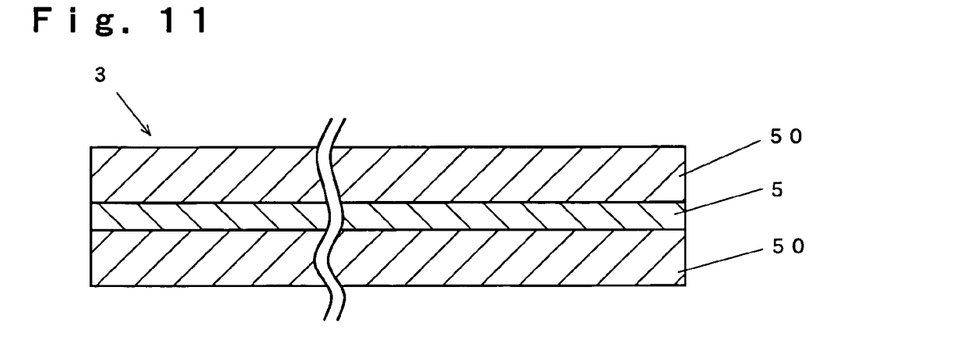
FIG. 11 is a cross-sectional view of the laminated plate.

This laminated plate $3$ has a structure which is formed by laminating a polycarbonate supporting layer $50$ on each side of a thin polarizing layer 5 as shown in FIG. 11, and the thickness thereof is set to 0.5 to 2.5 mm which is suitable for a bending process. The abovementioned thin polarizing layer 5 is formed of a polymer film such as polyvinyl alcohol with a dichroic coloring agent oriented thereon. In this embodiment, the thickness of the thin polarizing layer 5 is set to 0.05 mm, and the thickness of each supporting layer 50 is set to 0.7 mm.

Further, the abovementioned polarizing lens 1 shown in FIG. 5 is also formed by bending a similar laminated plate 3 (not shown).

Figure 12:
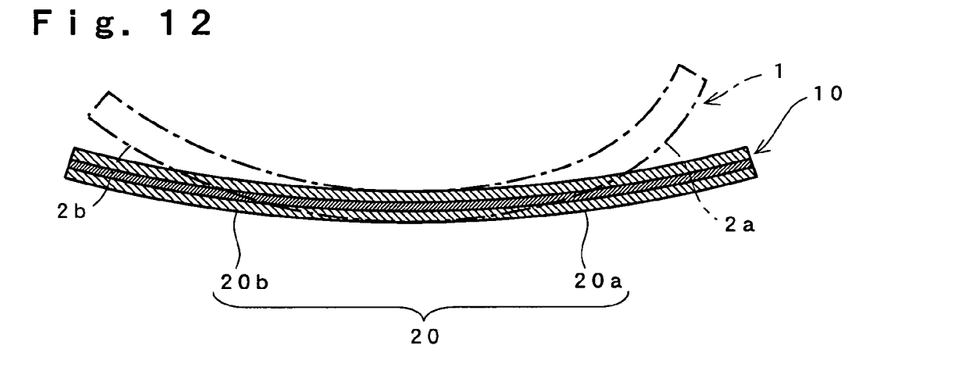
FIG. 12 is a horizontal cross-sectional view of an intermediate product.
Figure 13:
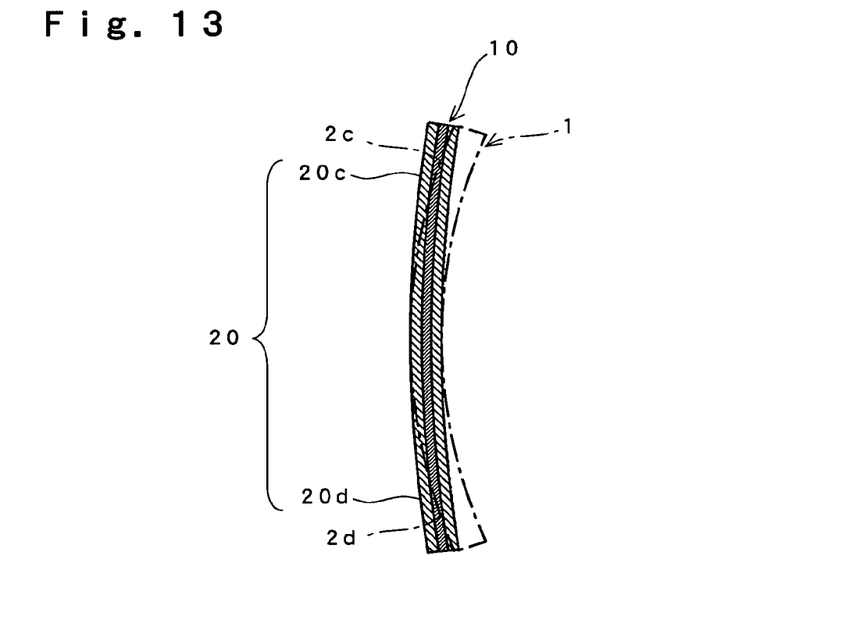
FIG. 13 is a vertical cross-sectional view of the intermediate product.

In this embodiment, when the polarizing lens 1 shown in FIG. 1 is produced by bending the abovementioned laminated plate 3, the laminated plate 3 is first subjected to a first bending process to thereby form an intermediate product 10 as shown by a solid line in FIGS. 12 and 13. The intermediate product 10 has a curved lens surface 20 having the degree of curvature smaller than that of a final product. Here, a dashed line in the drawings represents a curved lens surface 2 of the final product.

This intermediate product 10 has the curved lens surface 20 formed into a spherical surface. In the intermediate product 10, the degrees of curvature of curved surfaces 20a and 20b along the lateral axis x (the direction of the polarization axis) are set to 6R which is smaller than 8R to 11R of the final product. In addition, the degrees of curvature of curved surfaces 20c and 20d along the vertical axis y (the direction orthogonal to the polarization axis) are set to 6R which is smaller than 8R of the final product.

Here, the intermediate product 10 formed in the first bending process does not necessarily have a spherical surface in which the degree of curvature of the curved lens surface 20 is constant at all the points. The intermediate product 10 may have an aspherical surface in which the degree of curvature of the curved lens surface 20 continuously varies from the center toward the outer periphery.

After this intermediate product 10 is formed through the first bending process, the intermediate product 10 is subjected to a second bending process to thereby produce the aspherical polarizing lens 1 (the final product) having the abovementioned curved lens surface 2.

As described above, the bending process of the laminated plate 3 is performed in stages by dividing the process into the first and second bending processes. If the bending process is performed in the two stages, the target product can be more easily obtained without applying an excessive force as compared to the case in which the target product is formed in one bending process. Therefore, the properties related to distortion are improved.

FIGS. 14A to 14E show a production apparatus having a molding mechanism for molding the target polarizing lens 1 by performing the first and second bending processes and also show the manufacturing procedure thereof.

Figure 14A:
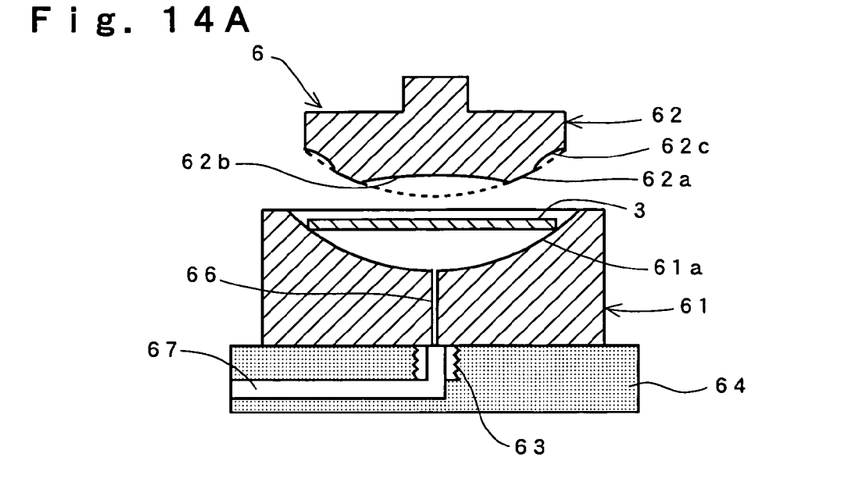
FIG. 14 is a series of cross-sectional views illustrating the configuration of a polarizing lens production apparatus according to an embodiment of the present invention and the production procedure therein.
Figure 14B:
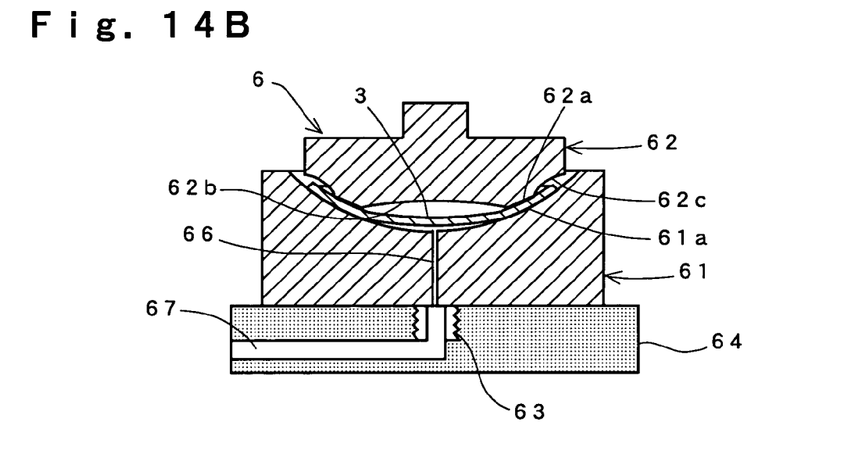
Figure 14C:
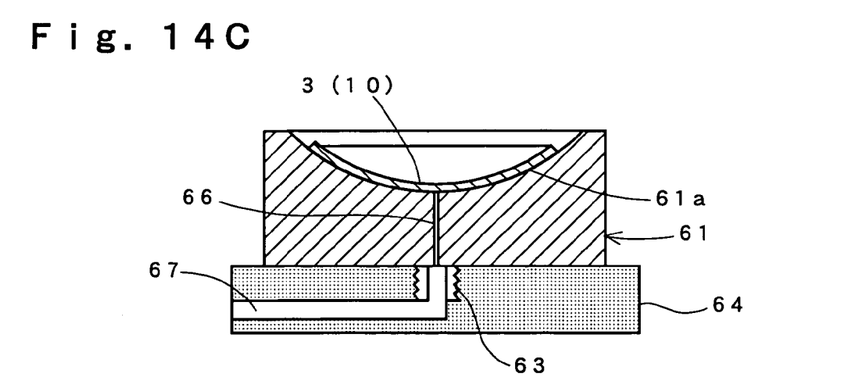
Figure 14D:
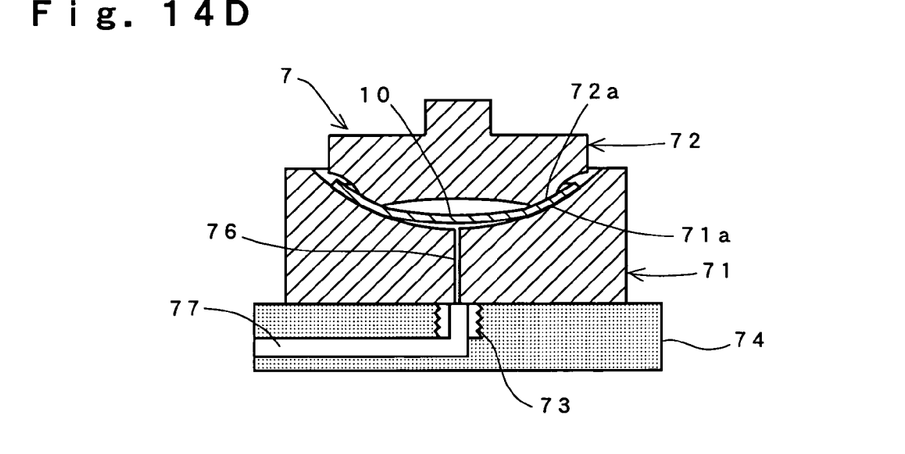
Figure 14E:
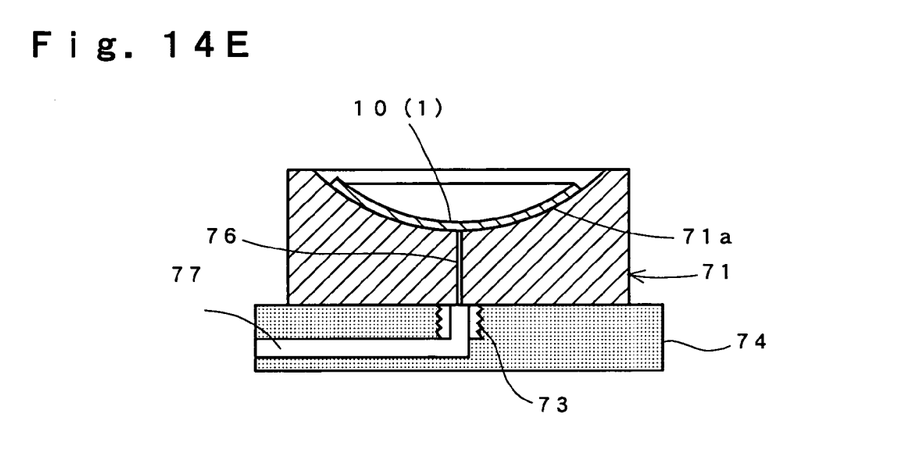

FIGS. 14A to 14C show the first bending process by means of a rough molding device 6, and FIGS. 14D and 14E show the second bending process by means of a finishing molding device 7. The abovementioned molding mechanism is constituted by the rough molding device 6 and the finishing molding device 7.

In the rough molding device 6 shown in FIGS. 14A to 14C, the reference numeral 61 designates a lower mold having a mold cavity 61a of a concave shape corresponding to the curved lens surface 20 of the abovementioned intermediate product 10. The reference numeral 62 designates an upper mold for pressing the outer periphery of the laminated plate 3 to the mold cavity 61a of the lower mold 61. The upper mold 62 has a pressure surface 62a of a ring shape conforming to the outer periphery of the mold cavity 61a of the lower mold 61. This upper mold 62 is formed of a soft material such as a silicon resin, rubber, elastomer, or fluororesin and has suitable heat resistance, flexibility, and elasticity.

The lower mold 61 is supported on a support base 64 and is heated by a heater 63 integrated in the support base 64. The lower mold 61 and the support base 64 have suction holes 66 and 67, respectively, which are in communication with the mold cavity 61a of the lower mold 61 for applying a suction force to the laminated plate 3. The suction holes 66 and 67 are in communication with each other, and the suction hole 67 is connected to a suction mechanism (not shown).

Figure 15:
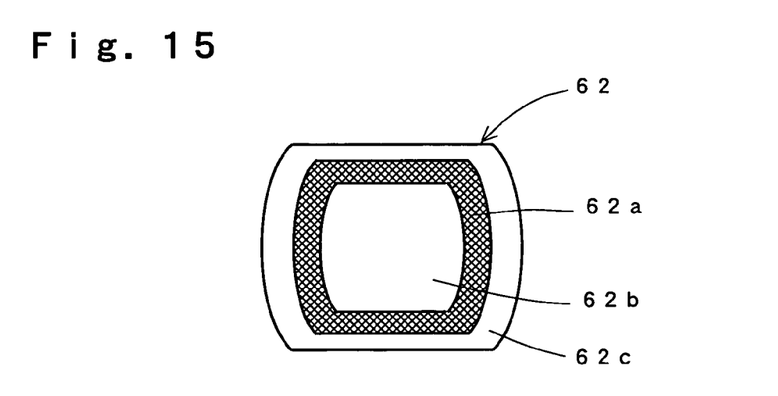
FIG. 15 is a plan view of an upper mold and a pressure surface of a rough molding device as viewed from below.

The shape of the upper mold 62 conforms to the shape of the laminated plate 3. As shown in FIG. 15, the exterior shape of the upper mold 62 is rectangular as viewed from below, and the shape of the pressure surface 62a is similar to the exterior shape of the upper mold 62. The shapes of the upper mold 62 and the pressure surface 62a are not limited to the shapes in this embodiment.

In the upper mold 62, the lower central portion which is surrounded by the pressure surface 62a and the periphery which surrounds the pressure surface 62a are concaved so as not to contact the laminated plate 3 during the bending processes. No particular limitation is imposed on the depth and shape of these concave portions 62b and 62c, so long as they do not contact the laminated plate 3 during the bending processes.

The finishing molding device 7 shown in FIGS. 14D and 14E includes a lower mold 71 and an upper mold 72. The lower mold 71 has a mold cavity 71a of a concave shape conforming to the curved lens surface 2 of the polarizing lens 1 serving as the final product, and the upper mold 72 has a pressure surface 72a of a convex ring shape conforming to the periphery of the mold cavity 71a. The configuration of the upper mold 72 is similar to that of the upper mold 62 of the rough molding device 6, and the description thereof is omitted.

The lower mold 71 is supported on a support base 74 and is heated by a heater 73 integrated in the support base 74. The lower mold 71 and the support base 74 have suction holes 76 and 77, respectively, which are in communication with the mold cavity 71a of the lower mold 71 for applying a suction force to the intermediate product 10. The suction holes 76 and 77 are in communication with each other, and the suction hole 77 is connected to a suction mechanism (not shown).

In order to mold the laminated plate 3 by means of the rough molding device 6, the lower mold 61 is first heated to a predetermined temperature by means of the heater 63, and the laminated plate 3 is placed horizontally on the mold cavity 61a of the lower mold 61 (FIG. 14A). In order to facilitate the bending process, the laminated plate 3 is subjected to hot air for a predetermined period of time for preheating.

The preheating and the heating of the laminated plate 3 may be performed by means of the hot air only. In this case, the heater 63 is not required to be integrated in the support base 64. In the method of heating the laminated plate 3 by means of the hot air only, the temperature in the atmosphere including the laminated plate 3 is set to a predetermined temperature.

Subsequently, the suction mechanism (not shown) is activated to generate a suction force in the mold cavity 61a of the lower mold 61, and at the same time the upper mold 62 is lowered. The ring-shaped pressure surface 62a of the upper mold 62 is then brought into contact with the laminated plate 3 to thereby press the periphery of the laminated plate 3. However, the concave portions 62b and 62c at the center and the periphery of the upper mold 62 do not contact the laminated plate 3. The laminated plate 3 undergoes thermal deformation by means of the suction force generated in the mold cavity 61a of the lower mold 61 and is attracted and adhered to the mold cavity 61a of the lower mold 61 (FIG. 14B).

During this bending process, the central portion of the laminated plate 3 is not pressed by the upper mold 62, but the periphery thereof inside the tabs 8 is pressed by the ring-shaped pressure surface 62a. Therefore, wrinkles are not formed around the tabs 8, and thus gaps caused by the wrinkles are not formed. Accordingly, air is prevented from entering the boundary between the laminated plate 3 and the mold cavity 61a of the lower mold 61 through the gaps. Therefore, a sufficient suction force is applied to the laminated plate 3, and thus the bending process is performed adequately.

Subsequently, the upper mold 62 is raised while the suction force is generated in the mold cavity 61a, and the molded product is subjected to hot air for a predetermined period of time for retaining the shape thereof (FIG. 14C). This molded product is removed from the mold cavity 61a to thereby obtain the intermediate product 10.

Subsequently, the intermediate product 10 is placed, with the orientation thereof adjusted, in the mold cavity 71a of the lower mold 71 of the finishing molding device 7 heated by means of the heater. The upper mold 72 is then lowered while the suction force is generated in the mold cavity 71a, thereby bending the intermediate product 10 in between the pressure surface 72a of the upper mold 72 and the mold cavity 71a of the lower mold 71 (FIG. 14D). Subsequently, the upper mold 72 is raised with the suction force generated in the mold cavity 71a, and the lower mold 71 is subjected to hot air for a predetermined period of time for retaining the shape of the product (FIG. 14E). Hence, the polarizing lens 1 serving as the final product is obtained and removed from the lower mold 71.

The thus-produced polarizing lens 1 is cut into a predetermined shape and attached to an eyeglass frame, thereby obtaining sunglasses.

When the polarizing lens 1 shown in FIG. 5 is produced by bending the laminated plate 3 shown in FIG. 10, a similar procedure (not shown) may be employed. That is, the laminated plate 3 is first subjected to a first bending process by means of a rough molding device 6 similar to the above to thereby form an intermediate product having a curved lens surface with the degree of curvature smaller than that of the final product. Subsequently, the intermediate product is subjected to a second bending process by means of a finishing molding device 7 similar to the above to thereby obtain the polarizing lens 1 serving as the final product.

What is claimed is:

1. A sunglass lens for a single eye, formed by subjecting a plastic plate to a bending process to thereby form a curved lens surface having a convex front face and a concave rear face, wherein
the curved lens surface is formed into an aspherical curved lens surface in which the degree of curvature along a lateral axis in an outer temple side with respect to the center thereof is greater than the degree of curvature along the lateral axis in an inner bridge side with respect to the center thereof and greater than the degree of curvature along a vertical axis, the degree of curvature along the lateral axis in the outer temple side continuously varies so as to gradually increase from the center of the curved lens surface approaching a periphery thereof, the degree of curvature along the lateral axis in the inner bridge side is constant, the curve along the lateral axis of the curved lens surface is formed so that the center is positioned ahead of other parts, and the curve along the lateral axis in the outer temple side and the curve along the lateral axis in the inner bridge side are curved backward, respectively.

2. The sunglass lens according to claim 1, wherein the plastic plate is a laminated plate formed of a thin polarizing layer having a polycarbonate supporting layer laminated on each of the sides thereof and is formed into a laterally elongated shape with a polarization axis thereof serving as the lateral axis.

3. The sunglass lens according to claim 1, wherein the curve along the vertical axis in the upper side and the curve along the vertical axis in the lower side with respect to the center thereof are curved backward, respectively.

4. A method for producing a sunglass lens for a single eye with a curved lens surface having a convex front face and a concave rear face, the method comprising:
subjecting a plastic plate to a first bending process to form an intermediate product having a curved lens surface with the degrees of curvature along a lateral axis and a vertical axis smaller than the degrees of curvature along the lateral axis and the vertical axis of a final product; and
subjecting the intermediate product to a second bending process to produce the final product having the degrees of curvature along the lateral and vertical axes larger than those of the intermediate product and having an aspheric curved lens surface in which the degree of curvature along the lateral axis in an outer temple side with respect to the center of the curved lens surface is greater than the degrees of curvature along the lateral axis in an inner bridge side and along the vertical axis, the degree of curvature along the lateral axis in the outer temple side continuously varies so as to gradually increase from the center of the curved lens surface approaching a periphery thereof, the degree of curvature along the lateral axis in the inner bridge side is constant, the curve along the lateral axis of the curved lens surface is formed so that the center is positioned ahead of other parts, and the curve along the lateral axis in the outer temple side and the curve along the lateral axis in the inner bridge side are curved backward, respectively.

5. A production apparatus for a sunglass lens for a single eye with a curved lens surface having a convex front face and a concave rear face, the apparatus comprising a molding mechanism for molding the sunglass lens by subjecting a plastic plate to bending processes, the molding mechanism comprising:
a rough molding device for molding an intermediate product by subjecting the plastic plate to a first bending process so that the intermediate product has a curved lens surface with the degrees of curvature along a lateral axis and a vertical axis smaller than the degrees of curvature along the lateral axis and the vertical axis of a final product; and
a finishing molding device for molding the final product by subjecting the intermediate product to a second bending process so that the final product has the degrees of curvature along the lateral and vertical axes larger than those of the intermediate product, and has an aspheric curved lens surface in which the degree of curvature along the lateral axis in an outer temple side with respect to the center of the curved lens surface is greater than the degrees of curvature along the lateral axis in an inner bridge side and along the vertical axis, the degree of curvature along the lateral axis in the outer temple side continuously varies so as to gradually increase from the center of the curved lens surface approaching a periphery thereof, the degree of curvature along the lateral axis in the inner bridge side is constant, the curve along the lateral axis of the curved lens surface is formed so that the center is positioned ahead of other parts, and the curve along the lateral axis in the outer temple side and the curve along the lateral axis in the inner bridge side are curved backward, respectively.

* * * * *